US011343118B2

(12) United States Patent
Walker et al.

(10) Patent No.: US 11,343,118 B2
(45) Date of Patent: May 24, 2022

(54) USER STATION FOR A SERIAL BUS SYSTEM AND METHOD FOR TRANSMITTING A MESSAGE IN A SERIAL BUS SYSTEM

(71) Applicant: Robert Bosch GmbH, Stuttgart (DE)

(72) Inventors: Steffen Walker, Reutlingen (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 16/966,716

(22) PCT Filed: Dec. 20, 2018

(86) PCT No.: PCT/EP2018/086336
§ 371 (c)(1),
(2) Date: Sep. 18, 2020

(87) PCT Pub. No.: WO2019/122208
PCT Pub. Date: Jun. 27, 2019

(65) Prior Publication Data
US 2021/0036884 A1     Feb. 4, 2021

(30) Foreign Application Priority Data

Dec. 22, 2017 (DE) .......................... 102017223770.8
Feb. 13, 2018 (DE) .......................... 102018202165.1

(51) Int. Cl.
*H04L 12/40* (2006.01)
*H04L 25/02* (2006.01)

(52) U.S. Cl.
CPC ........ *H04L 12/4013* (2013.01); *H04L 25/028* (2013.01); *H04L 2012/40215* (2013.01); *H04L 2012/40273* (2013.01)

(58) Field of Classification Search
CPC ............... H04L 12/4013; H04L 25/028; H04L 2012/40215; H04L 2012/40273; H04L 25/0272
See application file for complete search history.

(56) References Cited

U.S. PATENT DOCUMENTS

2002/0024929 A1    2/2002  Brueckner et al.
2013/0294460 A1*  11/2013  Hell .................. H04L 25/05
                                                  370/470

(Continued)

FOREIGN PATENT DOCUMENTS

CN        102957587 A      3/2013

OTHER PUBLICATIONS

International Search Report for PCT/EP2018/086336, dated Feb. 20, 2019.

(Continued)

*Primary Examiner* — Jay P Patel
(74) *Attorney, Agent, or Firm* — Norton Rose Fulbright US LLP; Gerard Messina (57) ABSTRACT

A user station for a bus system and a method for transmitting a message at different bit rates in a bus system. The user station includes a transmitting stage for transmitting a message on a bus line of the bus system. The transmitting stage switches between a first operating mode and a second operating mode when transmitting different phases of a message. The transmitting stage, in the first operating mode, generates a first data state as a bus state having different bus levels for two bus wires of the bus line, and generates a second data state as a bus state having the same bus level for the two bus wires of the bus line. The transmitting stage, in the second operating mode, generates the first and second data state in each case as a bus state having different bus levels for the two bus wires of the bus line.

20 Claims, 8 Drawing Sheets

(56) References Cited

U.S. PATENT DOCUMENTS

| | | | |
|---|---|---|---|
| 2013/0294540 A1* | 11/2013 | Hell | H04L 25/0298 |
| | | | 375/295 |
| 2014/0156893 A1* | 6/2014 | Monroe | G06F 13/3625 |
| | | | 710/117 |
| 2014/0330996 A1 | 11/2014 | de Haas | |
| 2014/0365693 A1* | 12/2014 | Monroe | H04L 12/40032 |
| | | | 710/105 |
| 2016/0036604 A1* | 2/2016 | Mori | H04L 25/029 |
| | | | 375/296 |
| 2016/0269200 A1* | 9/2016 | Pannwitz | H04L 12/40 |
| 2016/0285653 A1* | 9/2016 | Walker | H04L 12/40 |
| 2016/0308687 A1* | 10/2016 | Nickel | H04L 25/0384 |
| 2017/0063571 A1* | 3/2017 | Hehemann | H04L 12/413 |
| 2017/0070366 A1* | 3/2017 | Hehemann | H04L 12/4013 |
| 2017/0093596 A1* | 3/2017 | Wandel | H04L 12/413 |
| 2017/0199837 A1* | 7/2017 | Walker | G06F 13/4022 |
| 2017/0262400 A1* | 9/2017 | Hartwich | G06F 13/4286 |
| 2018/0041240 A1* | 2/2018 | Tsuchiya | H04L 25/0272 |
| 2018/0121385 A1* | 5/2018 | Segarra | H04L 12/40013 |
| 2018/0324000 A1* | 11/2018 | Hartwich | H04L 25/03834 |

OTHER PUBLICATIONS

Robert Bosch Gmbh, "CAN with Flexible Data-Rate Specification Version 1.0", Gerlingen, Germany, Apr. 17, 2012. Retrieved from the Internet on Sep. 18, 2020: https://can-newsletter.org/assets/files/ttmedia/raw/e5740b7b5781b896f55efcc2b93edf8.pdf. 34 Pages.

* cited by examiner

Fig. 14

USER STATION FOR A SERIAL BUS SYSTEM AND METHOD FOR TRANSMITTING A MESSAGE IN A SERIAL BUS SYSTEM

FIELD

The present invention relates to a user station for a serial bus system and to a method for transmitting a message in a serial bus system, which operates at a high data rate and with great error robustness.

BACKGROUND INFORMATION

A bus system, in which data are transmitted as messages in the Standard ISO11898-1:2015 as CAN protocol specification with CAN FD, is frequently used for the communication between sensors and control units, for example, in vehicles. The messages are transmitted between the bus users of the bus system, such as a sensor, control unit, transmitter, etc.

With the increasing number of functions of a technical system or of a vehicle, the data traffic in the bus system also increases. In addition, the data are often required to be transmitted faster than previously from the transmitter to the receiver. As a result, the required bandwidth of the bus system will continue to increase.

In order to be able to transmit data at higher bit rates than in CAN, an option has been provided in the CAN FD message format for switching over to a higher bit rate within a message. In such technologies the maximum possible data rate is increased beyond a value of 1 Mbit/s by using a higher clocking in the area of the data fields. Such messages are also referred to below as CAN FD frames or CAN FD messages. In CAN FD, the payload data length is expanded from 8 to up to 64 bytes and the data transmission rates are significantly higher than in CAN.

Even if a CAN or CAN FD-based communication network offers numerous advantages with respect to its robustness, for example, it still has a significantly lower speed as compared to a data transmission in, for example, 100 base-T1 Ethernet. Moreover, the payload data length of up to 64 bytes previously achieved with CAN FD is too short for some applications.

SUMMARY

It is an object of the present invention to provide a user station for a serial bus system and a method for transmitting a message in a serial bus system, which solve the aforementioned problems. In accordance with example embodiments of the present invention, a user station for a serial bus system and a method for transmitting a message in a serial bus system, in particular, are to be provided, in which a high data rate and an increase in the amount of payload data per frame may be implemented with high error robustness.

The object may be achieved by a user station for a serial bus system having the features of the present invention. In accordance with an example embodiment of the present invention, the user station includes a transmitting stage for transmitting a message on a bus line of the bus system, the transmitting stage being designed to switch between a first operating mode and a second operating mode when transmitting different phases of a message, the transmitting stage in the first operating mode being designed to generate a first data state as a bus state having different bus levels for two bus wires of the bus line, and a second data state as a bus state having the same bus level for the two bus wires of the bus line, and the transmitting stage in the second operating mode being designed to generate the first and second data state in each case as a bus state having different bus levels for the two bus wires of the bus line.

A significant increase in the bit rate and thus in the transmission speed from transmitter to receiver is implementable with the user station. However, in this case a high error robustness is simultaneously ensured.

Due to the design of the user station, error frames are no longer required. This also contributes to the implementation of a net data rate of at least 10 Mbps. In addition, the size of the payload data may amount to as much as 4096 bytes per frame.

A further advantage is that multiple domains per switches are interconnected according to demand. This reduces the wiring effort between the individual components of a technical system or of a vehicle. This is a particularly significant advantage with respect to the reduced time expenditure, lower material input and resultant reduced weight, in particular, in a vehicle.

The method carried out by the user station may also be used if at least one CAN user station and/or at least one CAN FD user station is/are also present in the bus system, which transmit messages according to the CAN protocol and/or the CAN FD protocol.

Advantageous further embodiments of the user station are described herein.

According to one specific embodiment variant, the transmitting stage is designed to switch into the first operating mode when data of a first phase of the message are to be transmitted, which are to be transmitted at a first bit rate, and to switch into the second operating mode when data of a second phase of the message are to be transmitted, which are to be transmitted at a second bit rate, which is faster than the first bit rate.

According to one further specific embodiment variant of the present invention, the transmitting stage is designed to only switch into the second operating mode for transmitting data if an exclusive, collision-free access to the bus line of the bus system is ensured for the user station for a predetermined period of time.

In one exemplary embodiment of the present invention, the transmitting stage has a first output stage, which is connected between a terminal for a voltage supply and a first bus wire of the bus line, a second output stage, which is connected between a second bus wire of the bus line and a connection for ground, a third output stage, which is connected between the first bus wire of the bus line and a connection for ground, a fourth output stage, which is connected between the terminal for the voltage supply and the second bus wire of the bus line, and a switching unit for actively switching only the first and second output stage or for actively switching the first through fourth output stage.

It is also possible that the first and fourth output stage include a PMOS transistor, and the second and third output stage include a NMOS transistor.

The transmitting stage is possibly designed to actively switch only the first and second output stage for the first operating mode and to actively switch the first and second output stage alternatingly to the third and fourth transmitting stage for the second operating mode.

According to one further exemplary embodiment of the present invention, the transmitting stage has a terminal for a transmit signal of a communication control unit of the user station, and the switching unit may include: a switch, which is connected between the terminal and the third output stage in order to switch the transmit signal to a gate terminal of a transistor of the third output stage or to separate it from the gate terminal, and a switch, which is connected between the terminal and the fourth output stage in order to switch the transmit signal to a gate terminal of a transistor of the fourth output stage or to separate it from the gate terminal.

It is possible for the message to include a data field having a variable length, the variable length being between 1 byte to 4096 bytes.

In the user station, the transmitting stage may be designed to transmit the data in the first operating mode with the same bus level to the bus line as in the second operating mode.

The transmitting stage is possibly designed to generate the bus level in the first operating mode with a first bus load resistor and the bus level in the second operating mode with a second bus load resistor, the first bus load resistor being smaller than the second bus load resistor.

The above-described user station may be part of a bus system, which also includes a parallel bus line and at least two user stations, which are interconnected in such a way that they are able to communicate with one another. In this case at least one of the at least two user stations is an above-described user station.

The aforementioned object may also be achieved by a method for transmitting a message in a serial bus system in accordance with an example embodiment of the present invention. In accordance with an example embodiment of the present invention, the method has the step: transmitting, using a transmitting stage of a user station of the bus system, a message on a bus line of the bus system, the transmitting stage switching between a first operating mode and a second operating mode, in order to carry out the transmission of different phases of a message, the transmitting stage generating in the first operating mode a first data state as a bus state having different bus levels for two bus wires of the bus line, and generating a second data state as a bus state having the same bus level for the two bus wires of the bus line, and the transmitting stage in the second operating mode generating the first and second data state each as a bus state having different bus levels for the two bus wires of the bus line.

The method provides the same advantages as described above with respect to the user station.

Further possible implementations of the present invention also include combinations not explicitly mentioned of features and specific embodiments described above or below with respect to the exemplary embodiments. In this case, those skilled in the art will also add individual aspects as improvements on or additions to the respective basic form of the present invention in view of the present disclosure.

BRIEF DESCRIPTION OF THE DRAWINGS

The present invention is described in greater detail below with reference to the figures and based on exemplary embodiments.

In the figures, identical or functionally identical elements are provided with the same reference numeral unless otherwise indicated.

DETAILED DESCRIPTION OF EXAMPLE EMBODIMENTS

Figure 1:
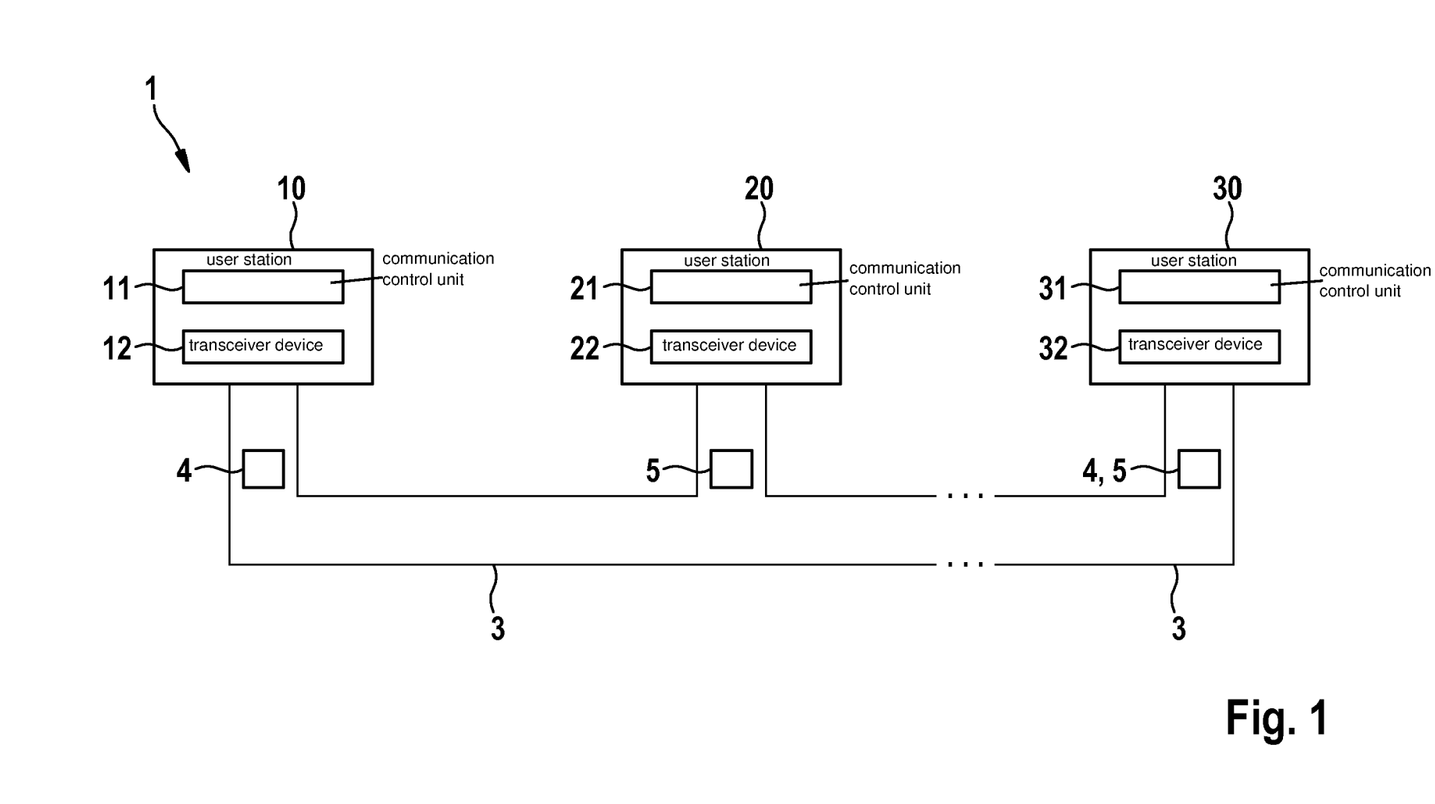
FIG. 1 shows a simplified block diagram of a bus system according to one first exemplary embodiment of the present invention.

FIG. 1 shows by way of example a bus system 1, which is designed, in particular, as a basis for a CAN bus system, a CAN FD bus system, a CAN EL bus system and/or modifications thereof, as described below. Bus system 1 may be used in a vehicle, in particular, a motor vehicle, an aircraft, etc., or in a hospital.

Bus system 1 in FIG. 1 has an, in particular parallel, bus line 3, to which a plurality of user stations 10, 20, 30 are connected. Messages 4, 5 in the form of signals are transmittable serially over bus line 3 between individual user stations 10, 20, 30. User stations 10, 20, 30 are, for example, control units, sensors, display devices, etc., of a motor vehicle.

As shown in FIG. 1, user station 10 has a communication control unit 11 and a transceiver device 12. In contrast, user station 20 has a communication control unit 21 and a transceiver device 22. User station 30 has a communication control unit 31 and a transceiver device 32. Transceiver devices 12, 22, 32 of user stations 10, 20, 30 are each directly connected to bus line 3, even though this is not illustrated in FIG. 1.

Communication control units 11, 21, 31 each serve to control a communication of respective user station 10, 20, 30 via bus line 3 with a different user station of user stations 10, 20, 30, which are connected to bus line 3.

Communication control unit 11 may be designed as a conventional CAN controller. Communication control unit 11 creates and reads first messages 4, for example, classic CAN messages 4. Classic CAN messages 4 are structured according to the classic basic format, in which a number of up to 8 data bytes may be encompassed in message 4. Alternatively, classic CAN message 4 is structured as a CAN FD message, in which a number of up to 64 data bytes may be encompassed which, in addition, are transmitted at a significantly faster data rate than in the case of classic CAN message 4. In the latter case, communication control unit 11 is designed as a conventional CAN FD controller.

Communication control unit 21 creates and reads second messages 5, which are modified CAN messages 5 for example. In this case, modified CAN messages 5 are structured on the basis of a CAN EL format, which is described in greater detail with reference to FIG. 2.

Communication control unit 31 may be designed in order, as needed, to provide for or to receive from transceiver device 32 a classic CAN message 4 or a CAN EL message 5. Thus, communication control unit 21 creates and reads a first message 4 or second message 5, first and second message 4, 5 differing in terms of their data transmission standard, namely, in this case, CAN or CAN EL. Alternatively, classic CAN message 4 is structured as a CAN FD message. In the latter case, communication control unit 11 is designed as a conventional CAN FD controller.

Transceiver device 12 may be designed as a conventional CAN transceiver or CAN FD transceiver. Transceiver device 22 may be designed as a CAN EL transceiver except for the differences described in still further detail below. Transceiver device 32 may be designed in order, as needed, to provide for or to receive from transceiver device 32 messages 4 according to the present CAN basic format or messages 5 according to the CAN EL format for communication control unit 31. Transceiver devices 22, 32 are additionally or alternatively implementable as a conventional CAN FD transceiver.

A formation and then transmission of messages 5 with the CAN EL format and the reception of such messages 5 may be implemented with the two user stations 20, 30.

Figure 2:
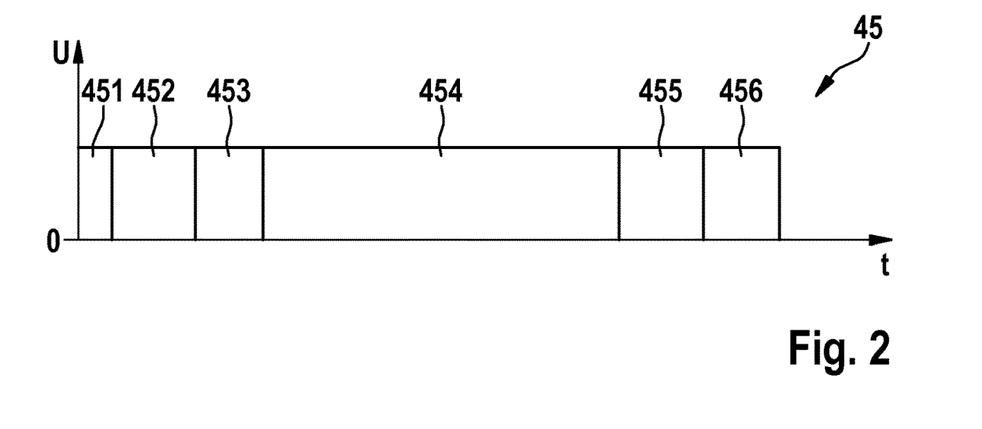
FIG. 2 shows a diagram for illustrating the structure of messages, which may be transmitted by user stations of the bus system according to the first exemplary embodiment of the present invention.

FIG. 2 shows for message 5 a CAN EL frame 45 as it is transmitted by transceiver device 22 or by transceiver device 32. CAN EL frame 45 is subdivided into different fields for the CAN communication on bus line 3, namely a start field 451, an arbitration field 452, a control field 453, a data field 454, a check sum field 455, and an end field 456.

Start field 451, for example, has one bit, which is also called a SOF bit and indicates the start of frame. An identifier including, in particular, 32 bits for identifying the transmitter of the message is contained in arbitration field 452. A, in particular, 13 bit-long data length code, which may have values up to 4096 with the increment of 1, is contained in control field 453. The payload data of the CAN EL frame or of message 5 are contained in data field 454. The payload data may include up to 4096 bytes according to the value of the data length code. A check sum about the data in data field 454 including the stuff bits is contained in check sum field 455, which is inserted by the transmitter of message 5 as an inverse bit after every 10 identical bits. At least one acknowledge bit is contained in end field 456 and, in addition, a sequence of 11 identical bits, which indicate the end of CAN EL frame 45. With the at least one acknowledge bit, it is communicated whether or not a receiver has discovered an error in received CAN EL frame 45 or in message 5.

A physical layer as in CAN and CAN FD is used in the phases for transmitting arbitration field 452 and end field 456. An important point during these phases is that the conventional CSMA/CR method is used, which allows simultaneous access of user stations 10, 20, 30 to bus line 3 without destroying higher prioritized message 4, 5. In this way, it is possible to relatively simply add further bus user stations 10, 20, 30 to bus system 1, which is very advantageous.

The result of the CSMA/CR system is that it must provide so-called recessive states on bus line 3, which may be "passed over" on bus line 3 by other user stations 10, 20, 30 having dominant states. High impedance conditions prevail at individual user stations 10, 20, 30 in the recessive state which, in combination with the parasites of the bus wiring, results in longer time constants. This results in a limitation of the maximum bit rate of the present CAN FD physical layer to presently 2 Mbps in real vehicle use.

Control field 453 and data field 454 are transmitted by a transmitter of message 5 on bus line 3 only if user station 20 as transmitter has won the arbitration and user station 20 as transmitter therefore has an exclusive access to bus line 3 of bus system 1 for transmitting fields 453 through 456. During the arbitration, it is negotiated with the aid of the identifier bit-wise between user stations 10, 20, 30 in arbitration field 452, which user station 10, 20, 30 might wish to transmit message 4, 5 having the highest priority and therefore obtains for the next time the exclusive access to bus line 3 of bus system 1 for transmitting fields 453 through 455.

The arbitration at the start of a frame 45 or message 4, 5 and the acknowledgment in end field 456 at the end of frame 45 or of message 4, 5 is possible only when the bit time is significantly more than twice as long as the signal propagation time between two arbitrary user stations 10, 20, 30 of bus system 1. The bit rate in the arbitration phase during transmission of fields 451, 452, 456 is therefore selected to be slower than in the remaining fields of frame 45.

Figure 3:
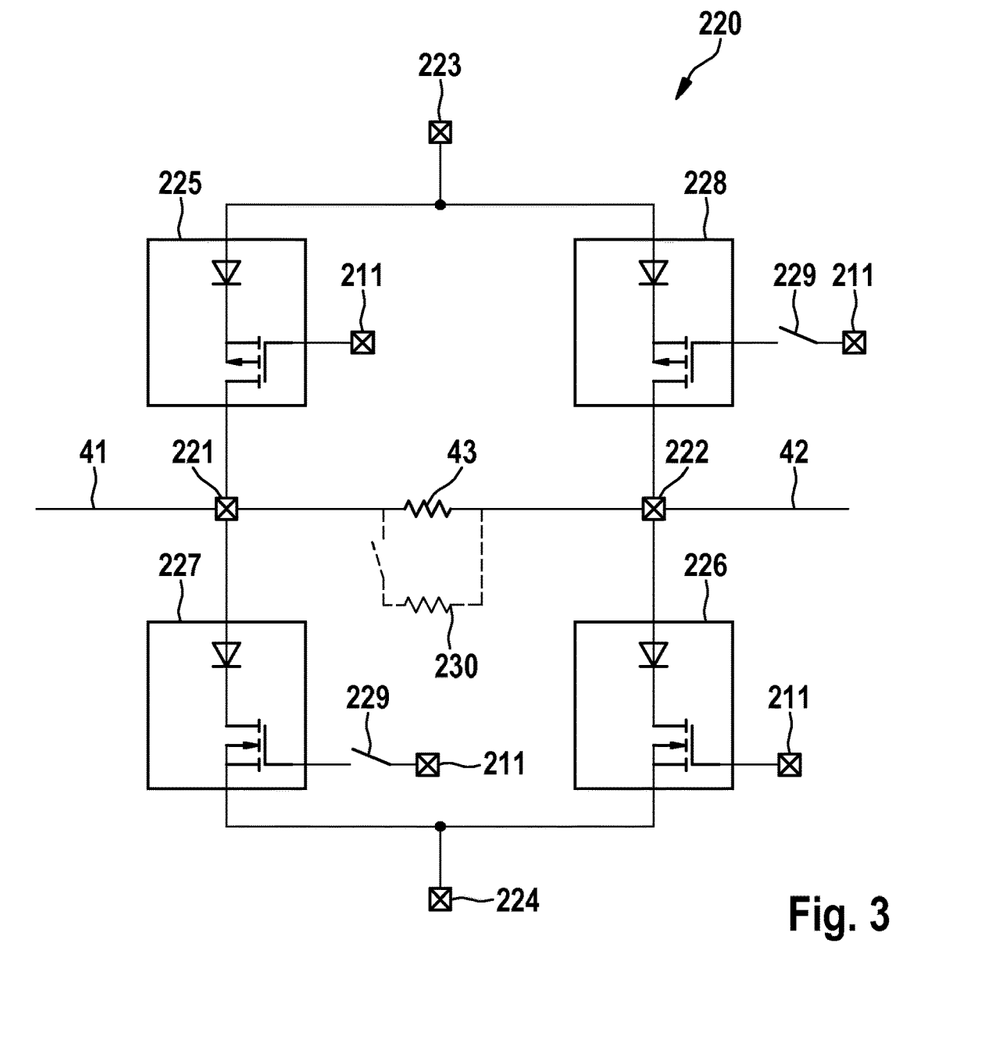
FIG. 3 shows a diagram of a transmitting stage of a user station of the bus system according to the first exemplary embodiment of the present invention.

FIG. 3 shows the design of a transmitting stage 220 of transceiver device 22 in the present exemplary embodiment. The receiving stage is not shown in FIG. 3, but may be designed as a conventional receiving stage for CAN or CAN FD messages.

In FIG. 3, transmitting stage 220 is connected at its terminals 221, 222 to parallel bus line 3, more precisely, to its first bus wire 41 for CAN_H and to its second bus wire 42 for CAN_L. A terminal 223 is provided in transceiver device 12 for the voltage supply for first and second bus wire 41, 42. The voltage supply may take place, in particular, with a voltage Vcc or CAN supply of, for example, approximately 2.5 volts according to the Standard ISO11898-1:2015 as CAN protocol specification with CAN FD. However, other voltage values are, of course, also selectable as voltage Vcc. The connection of transceiver device 22 to ground or CAN_GND is implemented via a terminal 224. A terminating resistor or external bus load resistor 43 is provided in the example shown for terminating first and second bus wire 41, 42.

According to FIG. 3, transmitting stage 220 has a first output stage 225 for signal CAN_H for first bus wire 41 and a second output stage 226 for signal CAN_L for second bus wire 42. Transmitting stage 220 also has a third output stage 227 for first bus wire 41 and a fourth output stage 228 for second bus wire 42. First and fourth output stage 225 and 228 each have one diode and one PMOS transistor (PMOS=p-conducting or p-channel metal-oxide semiconductor). Second and third output stage 226 and 227 each have one diode and one NMOS transistor (NMOS=n-conducting or n-channel metal-oxide semiconductor). Output stages 225 through 228 may be designed as the corresponding output stages for a conventional output stage of CAN.

The transistors of output stages 225 through 228 are each connectable at their gates directly or via a switch 229 to a terminal 211. From terminal 211, a transmit signal TxD of communication control unit 11 is input into transmitting stage 220. The two switches 229 form a switching unit. The two switches 229 are, in particular, jointly switchable.

Figure 4:
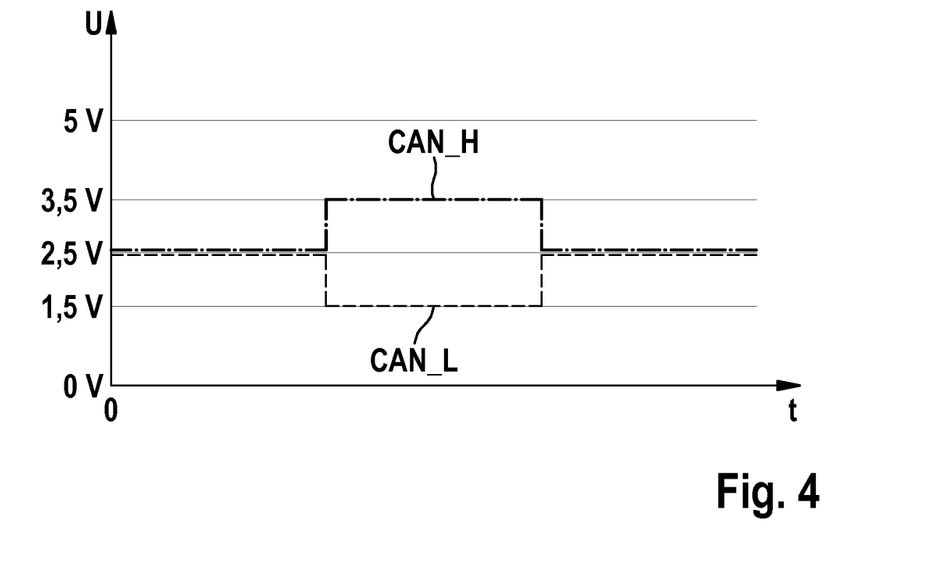
FIG. 4 shows a representation of one example of a temporal voltage curve of differential bus signals CAN_H and CAN_L, which are generated by the transmitting stage according to the first exemplary embodiment of the present invention for one part of a message.

In the phase for transmitting start field 451, arbitration field 452 and end field 456, transceiver device 22 activates in transmitting stage 220 only first output stage 225 for signal CAN_H for first bus wire 41 and second stage 226 for signal CAN_L for second bus wire 42 for driving a dominant bus state. In contrast, third and fourth output stage 227 and 228 remain inactive, not only for a recessive bus state, but also if transmitting stage 220 must drive a recessive bus state. This may take place, for example, by switching switch 229 into the opened position, which is shown in FIG. 4 or only via a corresponding signal at terminal 211 if the transistors of output stages 225 through 228 are each connected at their gates directly to terminal 211. If transmitting stage 220 is to drive a recessive bus state, then all output stages 225, 226, 227, 228 are disabled or inactive. As a result, signals CAN_H, CAN_L are set, which are shown in FIG. 4 and described in still greater detail below.

In the phase for transmitting control field 453, data field 454 and check sum field 455, transceiver device 22 activates in transmitting stage 220 both first and third output stage 225, 227 for a signal 411 on first bus wire 41 as well as second and fourth output stage 226, 228 for a signal 421 on second bus wire 42, as described in greater detail below. Thus, all output stages 225 through 228 are active in this phase of transmitting, as described in greater detail below. This may take place, for example, by switching switches 229 into the closed position, at which terminal 211 for transmit signal TxD of communication control unit 11 is connected to the gate of each transistor of output stages 227, 228. Alternatively, the switching of signal states 411, 421 is also possible only via a corresponding signal at terminal 211, as described above. As a result, signals 411, 421 arise as shown in FIG. 5 and are described in still greater detail below.

In the state of transmitting stage 220 shown in FIG. 4, the bus levels for CAN_H, CAN_L may be generated with a bus load resistor 43 of approximately 60 ohms. In contrast, the bus levels in the state of transmitting stage 220, in which switches 229 in FIG. 3 are closed, may be generated with a bus load resistor 43 of approximately 90 ohms. The switchover of bus load resistor 43 may take place, in particular, via a corresponding optional resistor 230 of transmitting stage 220, which is switchable in parallel to bus load resistor 43. In this way, a change of the resistance value of effective bus load resistor 43 or 43, 230 from a first or lower resistance value in the arbitration phase, which includes fields 456, 451, 452, to a second or higher resistance value effectuatable in the data phase, which includes fields 453 through 455. If resistor 230 is not present, bus load resistor 43 for the arbitration phase and the data phase may remain the same in each case. Bus load resistor 43 is then selectable as a value between 60 and 90 ohms, for example, 70 ohms or another suitable value.

According to FIG. 4, only the dominant states of differential signals CAN_H, CAN_L are driven differently with transmitting stage 220. In contrast, the bus levels on bus line 3 for the recessive states are the same as the voltage Vcc or CAN supply of, for example, approximately 2.5 volts. This results in a value of 0 volts for a voltage VDIFF=CAN_H−CAN_L for the recessive states and a value of approximately 2.0 volts for the dominant states, as evident from FIG. 4.

Figure 5:
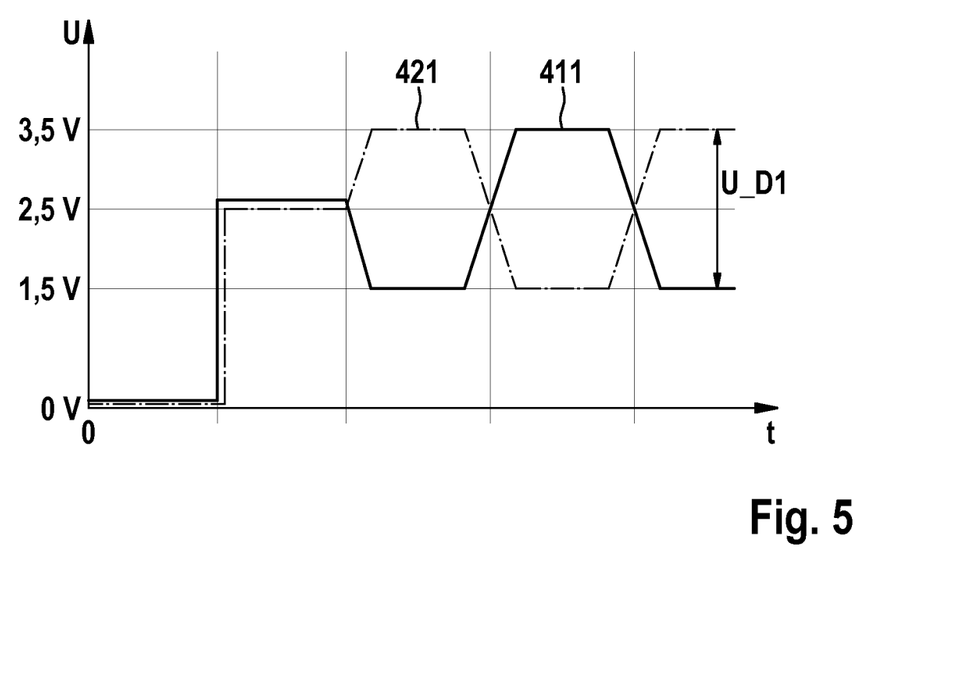
FIG. 5 shows a representation of one example of a temporal voltage curve of bus signals after a switchover of the transmitting stage according to the first exemplary embodiment into a faster data transmission operating mode than in FIG. 4.

If transceiver device 22 recognizes the end of the arbitration phase, then transmitting stage 220 is switched over from the state shown in FIG. 4 into the state in which the signal curves of FIG. 5 result for the bus levels generated in each case by transmitting stage 220.

After the switchover from the state of FIG. 4, an idle stage idle_LP, in which a bus level of approximately 0 volts arises in the specific example of FIG. 5, is reached according to FIG. 5 for signals 411, 421 in the faster data phase, which includes fields 453 through 455. In general, the state of a bus level of approximately 0 volts should not occur after the switchover. Thereafter, an idle state idle is reached, in which a bus level of approximately 2.5 volts in the specific example of FIG. 5 arises before bus states corresponding to data states Data_0 and Data_1 are reached. In this case, signal 411 for the bus state corresponding to data state Data_0 is drawn to approximately 1.5 volts via the NMOS transistor of third output stage 227. In contrast, signal 421 for the bus state corresponding to data state Data_0 is drawn to approximately 3.5 volts via the PMOS transistor of fourth output stage 228. Data_1 is reached by drawing signal 411 to approximately 3.5 volts via the PMOS transistor of first output stage 225 and by drawing signal 421 to approximately 1.5 volts via the NMOS transistor of second output stage 226. In the states described, bus levels between −0.6 volts and approximately −2 volts are present on bus line 3 in state Data_0 and bus levels between approximately 0.6 volts and approximately 2 volts are present in the state Data_1. Thus, in the states Data_0 and Data_1, a differential voltage U_D of signals 421, 411 generally has a maximum amplitude of approximately 1.4 volts.

In other words, transmitting stage 220 generates in a first operating mode according to FIG. 4 a first data state, for example, Data_1, as a bus state having different bus levels for two bus wires 41, 42 of the bus line and a second data state, for example, Data_0, as a bus state having the same bus level for the two bus wires 41, 42 of bus line 3.

Transmitting stage 220 also switches the first and second output stages 225, 226 to be conductive for the temporal signal curves 411, 421 according to FIG. 5 in a second operating mode that includes the data phase, and disables output stages 227, 228 if a first data state, for example, the state Data_1, is to be driven on bus line 3. In contrast, transmitting stage 220 switches third and fourth output stage 227 and 228 to be conductive and disables output stages 225, 226 if a second data state, for example, the state Data_0 is to be driven on bus line 3. Thus, transmitting stage 220 in the second operating mode is designed to generate the first and second data state each as a bus state having different bus levels for the two bus wires 41, 42 of bus line 3.

With the described switchover of transmitting stage 220, it is possible to achieve significantly higher data rates in the data phase than with CAN or CAN FD. In addition, the data length in data field 454 may be increased to up to 4096 bytes. In this way, the advantages of CAN with respect to the arbitration may be maintained and a greater number of data may still be effectively transmitted in a time shorter than previously—this means, without a repetition of the data being necessary due to an error, as explained below.

One further advantage is that error frames in bus system 1 are not required during the transmission of messages 5. As a result, messages 5 are no longer destroyed, which eliminates one cause for the need of a double transmission of messages. The net data rate increases as a result.

It is also possible with transmitting stage 22 to interconnect multiple domains or sub-bus systems 1 according to demand via switches not further described here. The networking in a technical system, for example, in a vehicle, may be significantly expanded as a result.

Figure 6:
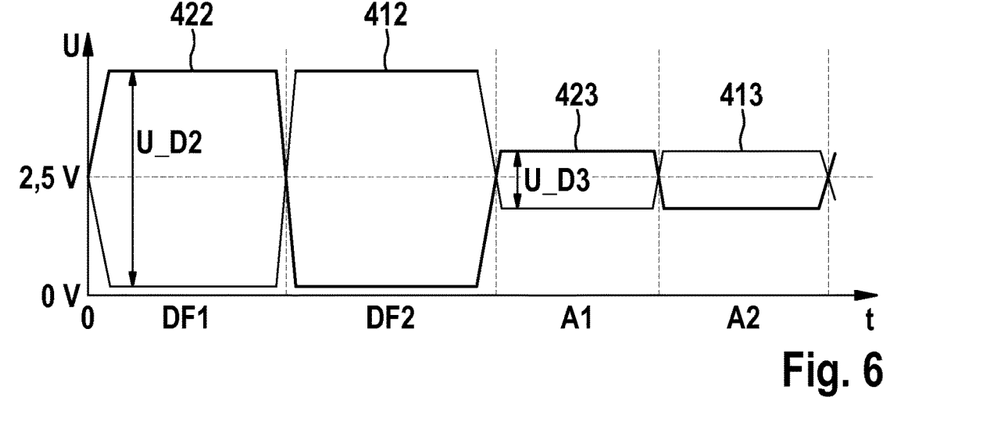
FIG. 6 shows a representation of one example of a temporal voltage curve of the bus signals CAN_H and CAN_L for one part of a message in one second exemplary embodiment of the present invention.

FIG. 6 shows voltage curves of bus signals 412, 422 and 413, 423 according to one second exemplary embodiment. The voltage curves of bus signals 412, 422 and 413, 423 result when switches 229 of transmitting stage 220 of FIG. 3 are omitted or are held in the closed state, so that the transistors of output stages 227, 228 are also directly connected to terminals 211.

Figure 7:
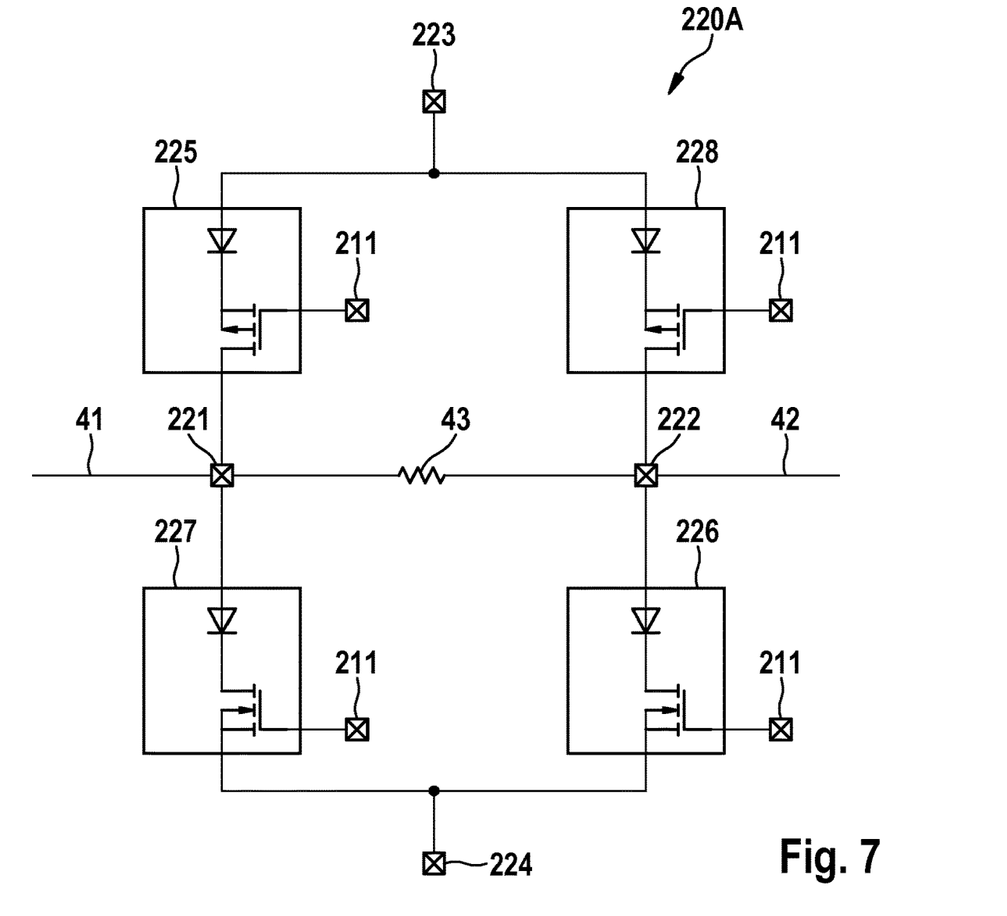
FIG. 7 shows a diagram of a transmitting stage of a user station of the bus system according to the second exemplary embodiment of the present invention.

FIG. 7 shows the resulting transmitting stage 220A of the second exemplary embodiment.

Thus, according to the second exemplary embodiment, one physical layer is used for the entire frame 45 of FIG. 2, which allows the aforementioned arbitration phase for fields 451, 452 and 456, as well as a long and fast data phase for fields 453, 454, 455. The advantage of the switching of transmitting stage 220A into such an operating mode is that transmitting stage 220A is completely symmetrically structured and also operates symmetrically in all communication phases. Thus, the value of bus load resistor 43 is not switched over, as described above with respect to FIG. 3 and FIG. 4.

The resulting bus signals in all four possible bus states DF1, DF2, A1, A2 in such a transmitting stage 220A are shown in FIG. 6. Differential voltage U_D2 of bus states DF1, DF2 has a higher amplitude than differential voltage U_D3 of bus states A1, A2. In this case, the amplitude of differential voltage U_D2 has a value that is n times greater than a value of the amplitude of differential voltage U_D3, n being an arbitrarily selectable natural number. However, the upper limit for the number of user stations 10, 20, 30 in bus system 1 is calculated as n−1. The amplitude of differential voltage U_D3 may therefore also be referred to as an amplitude basic unit.

Communication takes place with the two bus states DF1 and DF2 after the completed arbitration in the data phase, i.e., in fields 453 through 455. This is similar to the approach as described above with respect to FIG. 5. Bus state DF1 results in a positive differential voltage Vdiff=U_D2 (V_Plus−V_Minus). Bus state DF2 results in a negative differential voltage Vdiff=−U_D2. Bus state A1 results in a positive differential voltage Vdiff=U_D3 (V_Plus−V_Minus). Bus state A2 results in a negative differential voltage Vdiff=−U_D3.

Bus states A1 and A2 are introduced in order to allow an arbitration. Bus states A1, A2 are qualitatively identical to bus states DF1 and DF2, but are driven weaker than bus states DF1 and DF2 by transmitting stage 220A, as illustrated in FIG. 7. Bus states A1, A2 may therefore be overwritten for arbitration purposes by other user stations 10, 30.

During an arbitration phase, user stations 10, 20, 30, in particular, transmitting stage 220A, are designed to transmit a differential voltage Vdiff with an amplitude basic unit, i.e., U_D3=1 unit on bus line 3 and to check which differential voltage Vdiff is present on bus line 3. If a differential voltage Vdiff>1 unit or an amplitude basic unit is present, the relevant user station 10, 20, 30 withdraws and is therefore the loser of the arbitration.

Transmitting stage 220A in the present exemplary embodiment thus switches in a first operating mode between two first different bus states A1, A2 for the message if data of the arbitration phase or first phase 456, 451, 452 of message 5 are to be transmitted. Transmitting stage 220A also switches into a second operating mode with the two second different bus states DF1, DF2 for message 5 if data of the data phase or second phase 453, 454, 455 of message 5 are to be transmitted. Thus, transmitting stage 220A switches between more than two different bus states DF1, DF2, A1, A2 in order to transmit message 5 or frame 45. In this case, the two bus states DF1, DF2 respectively are symmetrical to one another. The two bus states A1, A2 are also symmetrical to one another. Even more than the aforementioned four bus states are, of course, possible.

As a result, all components of transmitting stage 220A in the present exemplary embodiment are always active and involved, both in the arbitration phase as well as in the data phase, which results in a maximum symmetry. This results in advantages in the bit timings and in the time behavior of the bits of message 5 and electromagnetic compatibility (EMC).

The same advantages may also be achieved with the design of transmitting stage 220A in the present exemplary embodiment as described above with respect to the first exemplary embodiment.

According to one modification of the second exemplary embodiment, one of the following combinations of bus states, instead of bus states A1 with A2, is used in the arbitration:

bus state DF1 with bus state A2
bus state DF2 with bus state A1

According to one further modification of the second exemplary embodiment, all four bus states DF1, DF2, A1, A2 are utilized in one further design at least for transmitting data field 454. A utilization of the four bus states DF1, DF2, A1, A2 in fields 453, 455 is also possible. The bit rate may thus be increased by coding.

According to one still further modification of the second exemplary embodiment, the frequency of signals 412, 422, 413, 423 is reduced. In this way, an improvement in the EMC behavior is achievable. With the above-described coding into more than two bus states, it is possible to hold the bit rate constant in spite of a lower frequency.

Otherwise, the same applies as described above in conjunction with the first exemplary embodiment.

Figure 8:
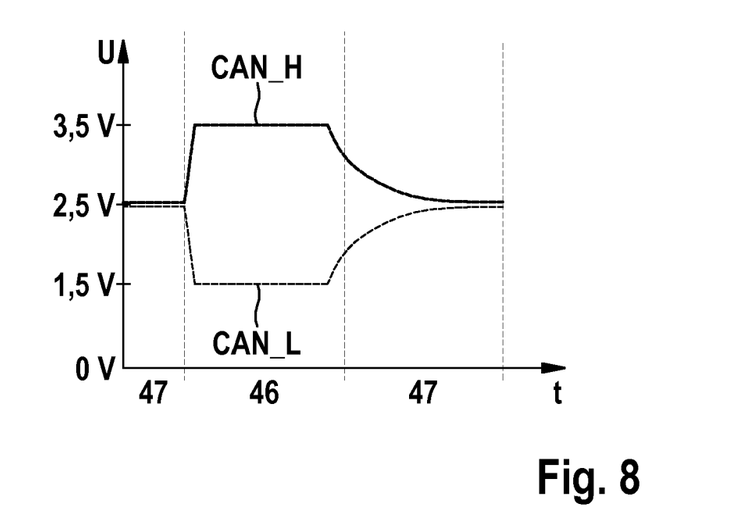
FIGS. 8 and 9 each show a representation of one example of a temporal voltage curve of differential bus signals for different parts of a message in one third exemplary embodiment of the present invention.
Figure 9:
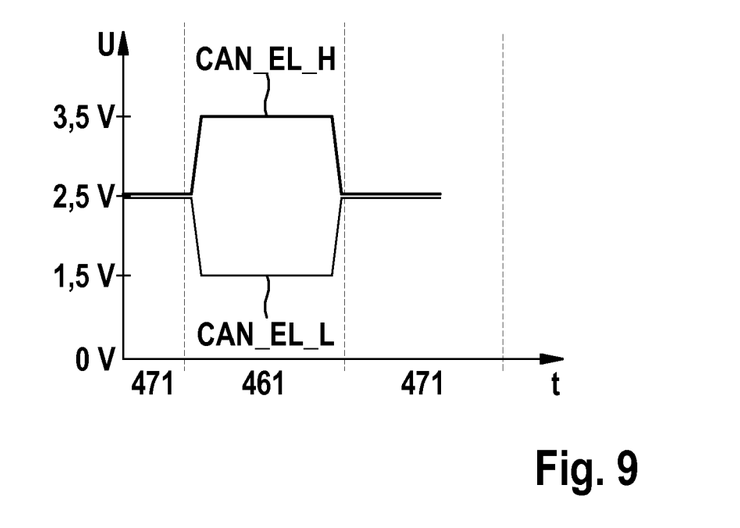

FIG. 8 and FIG. 9 show voltage curves of bus signals CAN_H, CAN_L for explaining the behavior of a bus system 1 according to one third exemplary embodiment.

FIG. 8 shows the conventional voltage curves of bus signals CAN_H and CAN_L, which are used for transmitting a message 5 or a frame 45 according to the present exemplary embodiment for arbitration phase 456, 451, 452 of frame 45. The voltage curves of bus signals CAN_H and CAN_L show a significantly slower state change during a transition from a dominant state 46 to a recessive state 47 than during a transition from recessive state 47 to dominant state 46.

In contrast thereto, signals CAN_EL and CAN_EL_L according to FIG. 9, which have a high state 461 and a low state 471, are generated, however, in the present exemplary embodiment for data phase 453, 454, 455 of frame 45. The signals according to FIG. 9 are generated with a physical layer, in which high states 461 equal a dominant state 46 of CAN or CAN FD, as it is shown in FIG. 8 and has voltage values for CAN_H=3.5 volts and CAN_L=1.5 volts. Low states 471, which equal a recessive state 47 of CAN or CAN FD based on their level, as it is shown in FIG. 8, are also generated in the physical layer according to FIG. 9, and have values for CAN_H=CAN_L=2.5 volts.

As shown in FIG. 9, the transition from high state 461 to low state 471 takes place approximately just as fast as the transition from low state 471 to high state 461.

This is achieved by low state 471 being driven at low impedance ("low impedance recessive"). As a result, the slower transition from dominant state 46 to recessive state 47, as it is shown in FIG. 8, is accelerated in the signals of FIG. 9. Bit rates significantly above 2 Mbps may be subsequently achieved for data phase 453, 454, 455 of frame 45.

In the present exemplary embodiment, therefore, a switchover takes place from the CAN physical layer into another physical layer using transceiver device 22 and/or transceiver device 32 when the end of the arbitration phase is identified. Since error frames may be dispensed with, no other user station 10, 20, 30 need be able to pass over instantaneously transmitting user station 10, 20, 30 in the data phase. Consequently, no recessive (high-impedance) bus states are required in the data phase.

Figure 10:
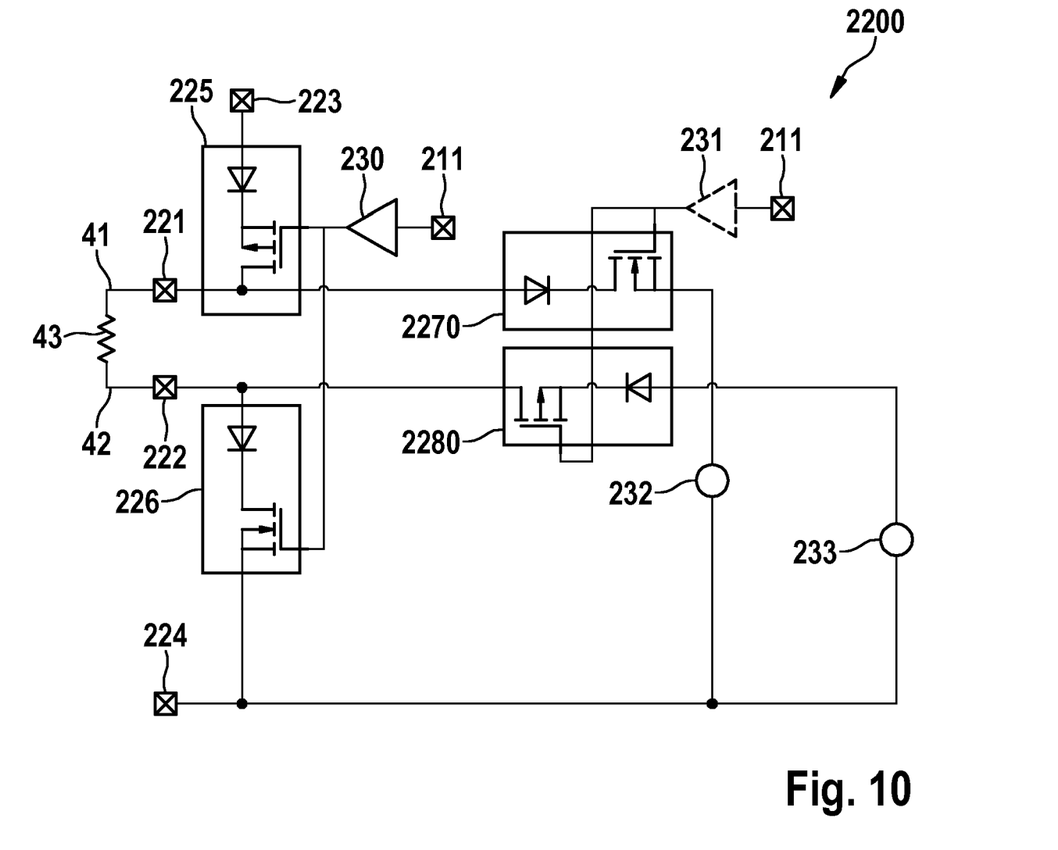
FIG. 10 shows a diagram of a transmitting stage of a user station of a bus system according to a third exemplary embodiment of the present invention.

The physical layer for the signal curves according to FIG. 9 may be achieved, for example, using a transmitting stage 2200 according to FIG. 10.

As shown in FIG. 10, transmitting stage 2200 according to the present exemplary embodiment has, in contrast to transmitting stage 220 of FIG. 3, a third output stage 2270 connected to a voltage source 232 and a fourth output stage 2280 connected to a voltage source 233. Third output stage 2270 has one NMOS transistor and one diode. Fourth output stage 2280 has one PMOS transistor and one diode. The transistors of the first and second output stage 225, 226 are activated with transmit signal TxD via a driver circuit 320. The transistors of third and fourth output stage 225, 226 are activated with transmit signal TxD via a driver circuit 231.

In the data phase of frame 45, i.e., at a high bit rate, a high state 461 is mapped in that output stages 225, 226 activated via driver circuit 230 become conductive or are actively switched on and output stages 227, 228 and voltage sources 232, 233 activated via driver circuit 231 are high impedance or are switched off. In order to drive a low state 471 (low-impedance driven recessive), the driver capability for output stages 225, 226 activated via driver circuit 230 are, in particular, strongly reduced and output stages 227, 228 and voltage sources 232, 233 activated via driver circuit 231 become conductive. The reduction of the driver capability also includes the case that output stages 225, 226 are switched off, which means the strongest reduction of the driver capability. Thus, the NMOS transistor of third output stage 2270 draws terminal 221 for CAN_EL_H to 2.5 volts and the PMOS transistor of fourth output stage 2280 raises terminal 221 for CAN_EL_L to 2.5 volts, resulting in a low bus state 471.

The circuitry of FIG. 10 is meaningful primarily in junction-isolated semiconductor technologies.

As a result, a very good symmetry of the bus signals in the data phase is achieved in the present exemplary embodiment. This results in advantages in the bit timings and time behavior of the bits of message 5 and electromagnetic compatibility (EMC).

The same advantages may also be achieved with the design of transmitting stage 2200 in the present exemplary embodiment as described above with respect to the first and second exemplary embodiment.

The aforementioned principle of the low impedance driving of low state 471 (low impedance driven recessive) is alternatively usable for all other serial bus systems, in which recessive states are present.

Otherwise, the same applies as described above in conjunction with the first exemplary embodiment.

Figure 11:
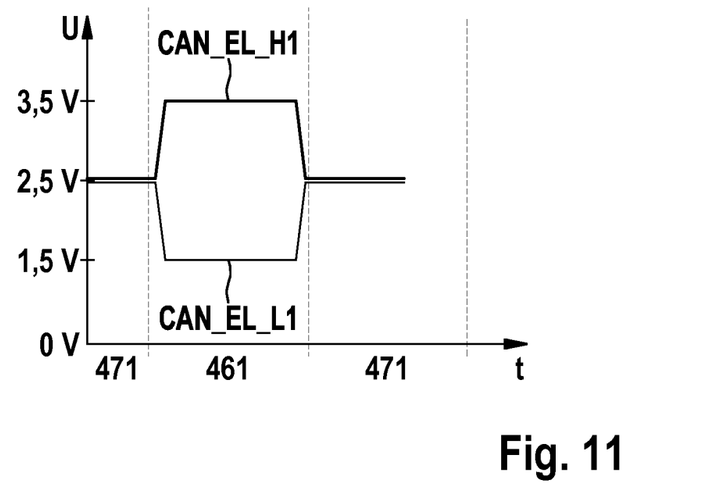
FIGS. 11 and 12 each show a representation of one example of a temporal voltage curve of differential bus signals for different parts of a message in one fourth exemplary embodiment of the present invention.
Figure 12:
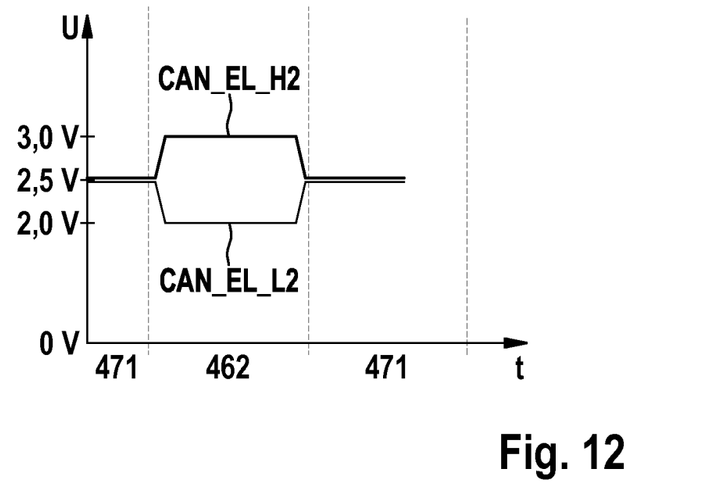

FIG. 11 and FIG. 12 show voltage curves of bus signals CAN_EL_H1, CAN_EL_L1 AND CAN_EL_H2, CAN_EL_L2 for explaining the behavior of a bus system 1 according to one fourth exemplary embodiment.

The voltage curves of bus signals CAN_EL_H1, CAN_EL_L1 of FIG. 11 are identical to the voltage curves of bus signals CAN_EL_H, CAN_EL_L of FIG. 9. The difference, however, is that transmitting stage 2200 of FIG. 10 generates the voltage curves of bus signals CAN_EL_H1, CAN_EL_L1 of FIG. 11 in the arbitration phase of frame 45. Alternatively, however, the voltage curves of bus signals CAN_H, CAN_L of FIG. 8 are usable in the arbitration phase of frame 45.

In contrast, if the end of the arbitration phase is identified, transmitting stage 2200 in the present exemplary embodiment switches into an operating mode, in which transmitting stage 2200 generates the voltage curves of bus signals CAN_EL_H2, CAN_EL_L2 of FIG. 12 for the data of the data phase of frame 45. Bus signal CAN_EL_H2 of FIG. 12 has a voltage level of approximately 3.0 volts in a dominant state 462. High state 461 of FIG. 11, which is also a dominant state, corresponds to dominant state 462 of FIG. 12. Bus signal CAN_EL_L2 of FIG. 12 has a voltage level of approximately 2.0 volts in dominant bus state 462. Thus, dominant bus state 462 has voltage levels for bus signals CAN_EL_H2, CAN_EL_L2, which are reduced in the arbitration phase compared to the voltage levels for dominant bus state 461 of bus signals CAN_EL_H1, CAN_EL_L1. As a result, differential voltage Vdiff=CAN_EL_H2−CAN_EL_L2 of the signals of FIG. 12 is only at 1.0 volts and is thus lower than, more precisely, only half as high as differential voltage Vdiff of the signals of FIG. 11 or of FIG. 8, provided bus load resistor 43 remains the same. In contrast, low states 471 are unchanged.

More stable signal curves at Vdiff result in the present exemplary embodiment as compared to the bus signals according to FIG. 8 and FIG. 9 of the preceding exemplary embodiment, which enables a reception of lower transmission levels with user stations 20, 30, more precisely, their transceiver devices 22, 32.

With the described signals of FIG. 11 and FIG. 12, it is possible to drive both a sharply increased bit rate of >12 Mpbs and a data volume of up to 4096 bytes at least in data field 454, as described above. However, the current consumption and thus the power consumption of transmitting stage 2200 may be significantly reduced by the switchover of the bus signals in the data phase to bus signals CAN_EL_H2, CAN_EL_L2 as compared to the preceding exemplary embodiments, even if many more switching operations per time take place than in CAN or CAN FD. This is achieved by a lowering of the transmission levels or the amplitude of VDIFF at least in data field 454.

To achieve signal useful integrity at increasing bit rate, the topologies of bus systems 1 have to be drastically simplified. This yields the advantage that a lower emission is present as a result of the reduced transmission levels and the EMC compatibility is improved as a result.

Otherwise, the same applies as described above in conjunction with the third exemplary embodiment.

In one modification of the third exemplary embodiment, transmitting stage 2200 of FIG. 10 has no output stages 2270, 2280. In this case, transmitting stage 2200 of FIG. 10 is designed as a conventional CAN transmitting stage. In order to obtain the preceding described signal curves of FIG. 11 and FIG. 12, such a conventional CAN transmitting stage is controlled in such a way that the driver or output stages 225, 226 are operated "normally" as in CAN for dominant states or high states 461 outside the data phase, i.e., signal curves according to FIG. 11. In contrast, the driver or output stages 225, 226 are operated at high impedance for dominant states 462 of FIG. 12, i.e., in data phase 225 and 226, as a result of which the level of the respective dominant states 462 is reduced as compared to the level of the respective dominant states or high states 461.

Figure 13:
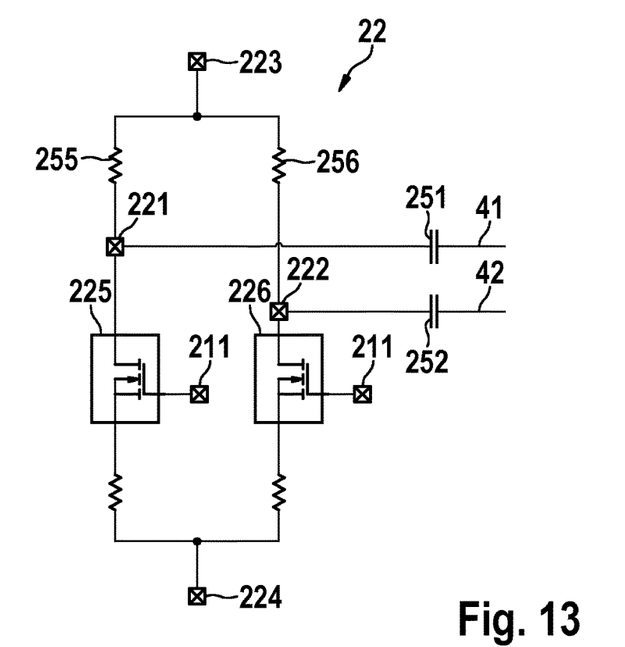
FIG. 13 shows a diagram of a coupling of the transmitting stage of a user station to bus wires of a bus system according to one fifth exemplary embodiment of the present invention.

FIG. 13 shows one example of a coupling of transceiver device 22 to bus line 3 with its two bus wires 41, 42. The coupling may be used in all transceiver devices 22, 23 of the preceding exemplary embodiments and their transmitting stages 220, 220A, 2200.

For the coupling of transceiver device 22 to bus line 3, a first coupling capacitor 251 is provided for coupling transceiver device 22 to first bus wire 41 and a second coupling capacitor 251 is provided for coupling transceiver device 22 to second bus wire 42. In addition, a resistor 255 is provided between terminal 223 for the voltage supply for first and second bus wire 41, 42 and terminal 221 for first bus wire 41. A resistor 256 is also provided between terminal 223 and terminal 222 for second bus wire 42.

The capacitances or coupling capacitors 251, 252 are provided externally of respective transceiver devices 22. Coupling capacitors 251, 252 implement a galvanically isolated connection of respective transceiver device 22 to bus wires 41, 42 in contrast to other serial bus systems 1, such as CAN or CAN FD or FlexRay, etc.

The advantage of the AC coupling or alternating voltage coupling or alternating current coupling with the aid of coupling capacitors 251, 252 is that common mode interferences on bus line 3 do not disrupt respectively present transmitting stage 220, 220A, 2200 of the preceding exemplary embodiments or according to FIG. 13. One additional advantage is that due to the galvanic isolation or separation, respectively present transmitting stage 220, 220A, 2200 of the preceding exemplary embodiments or according to FIG. 13 may be implemented in low voltage CMOS technology (CMOS=complementary metal-oxide semiconductor=semiconductor components, in which both p-channel as well as n-channel MOS transistors are used on a shared substrate). This results in a significantly greater accuracy between the two pin driver stages of output stages 225, 226 and in faster switching times.

In this way, it is possible to further increase the speed of the transmission of the data in bus system 1 of the above-described exemplary embodiments.

The transmitting stage in the circuit of FIG. 13 is structured in such a way to draw first and second coupling capacitor 251, 252 with high or low currents to the corresponding levels of a dominant or recessive bus state or of high bus state 461, 462 and of low bus state 471.

Figure 14:
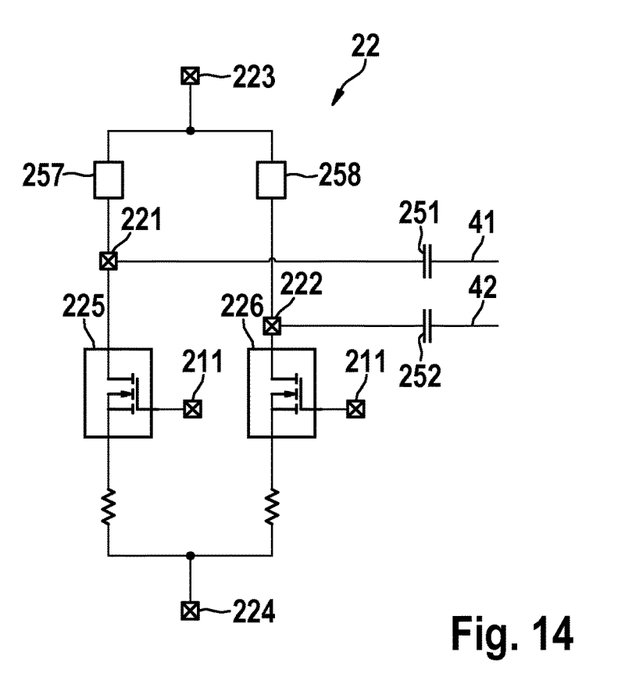
FIG. 14 shows a diagram of a coupling of the transmitting stage of a user station to bus wires of a bus system according to one modification of the fifth exemplary embodiment of the present invention.

As shown very schematically in FIG. 14, a transistor 257 is provided according to one modification of the fifth exemplary embodiment instead of resistor 255, which is provided between terminal 223 for the voltage supply for first and second bus wire 41, 42 and terminal 221 for first bus wire 41. In addition, a transistor 258 is provided instead of resistor 256, which is provided between terminal 223 and terminal 222 for second bus wire 42. In this way as well, it is possible to implement the galvanically isolated connection of respective transceiver device 22 to bus wires 41, 42 using coupling capacitors 251, 252.

All above-described embodiments of bus system 1, of user stations 10, 20, 30 and of the method carried out by the former may be used individually or in all possible combinations. All features of the above-described exemplary embodiments and/or their embodiment variants and/or their modifications may, in particular, be arbitrarily combined. In addition or alternatively, the following modifications, in particular, are conceivable.

The above-described bus system 1 according to the exemplary embodiments is described with reference to a bus system based on the CAN protocol. Bus system 1 according to the exemplary embodiments may, however, also be another type of serial communication network, in which data are transmittable serially at two different bit rates. It is advantageous, but not a necessary precondition, that in bus system 1 an exclusive collision-free access of a user station 10, 20, 30 to a shared channel is ensured at least for particular time spans.

The number and arrangement of user stations 10, 20, 30 in bus system 1 of the exemplary embodiments is arbitrary. User station 10, in particular, may be omitted in bus system 1. It is possible that one or multiple of user stations 10 or 20 or 30 are present in bus system 1.

What is claimed is:

1. A user station for a serial bus system, comprising:
a transmitting stage configured to switch between a first operating mode in which the transmitting stage transmits a first phase of a message on a bus line of the bus system and a second operating mode in which the transmitting stage transmits a second phase of the message on the bus line, wherein:
in the first operating mode, (i) a first data value is generated on the bus line by setting two bus wires of the bus line so that voltage levels of the two bus wires are different resulting in a first differential voltage between the two bus wires, and (ii) a second data value is generated on the bus line by setting the two bus wires of the bus line so that the voltage levels of the two bus wires are different; and
either:
(a)(1) in the first operating mode, the difference between the voltage levels of the two bus wires when the second data value is generated results in a second differential voltage whose absolute value is equal to an absolute value of the first differential voltage, and (2) in the second operating mode, the first data value is generated on the bus line by setting the two bus wires of the bus line so that the voltage levels of the two bus wires are different and the second data value is generated on the bus line by setting the two bus wires of the bus line so that the voltage levels of the two bus wires are equal to each other; or
(b)(1) in the second operating mode, (i) the first data value is generated on the bus line by setting the two bus wires of the bus line so that voltage levels of the two bus wires are different, and (ii) the second data value is generated on the bus line by setting the two bus wires of the bus line so that the voltage levels of the two bus wires are different, and (2) the first operating mode and the second operating mode differ from each other with respect to a value of the differential voltage resulting from the different voltage levels on the two bus wires of the bus line.

2. The user station as recited in claim 1, wherein the transmitting stage is configured to switch into the first operating mode when data of the first phase of the message are to be transmitted, the first phase of the message being transmitted at a first bit rate, and to switch into the second operating mode when data of the second phase of the message are to be transmitted, the second phase of the message being transmitted at a bit rate that is slower than the first bit rate.

3. The user station as recited in claim 1, wherein the transmitting stage is configured to switch only into the first operating mode for transmitting data when an exclusive, collision-free access to the bus line of the bus system is ensured for the user station for a predetermined period of time.

4. A user station for a serial bus system, the user station comprising:
  a transmitting stage configured to:
    transmit a message on a bus line of the bus system;
    switch between a first operating mode and a second operating mode when transmitting different phases of the message;
    in the first operating mode, (a) generate a first data state as a bus state having different bus levels for two bus wires of the bus line, and (b) generate a second data state as a bus state having the same bus level for the two bus wires of the bus line; and
    in the second operating mode, (a) generate the first data state and the second data state as a bus state having different bus levels for the two bus wires of the bus line;
  wherein the transmitting stage includes:
    a first output stage connected between a terminal for a voltage supply and a first of the two bus wires;
    a second output stage connected between a second of the two bus wires and a terminal for ground;
    a third output stage connected between the first of the two bus wires and a terminal for ground;
    a fourth output stage connected between the terminal for the voltage supply and the second of the two bus wires; and
    a switching unit configured to actively switch only the first output stage and second output stage and to actively switch the first output stage, the second output stage, the third output stage, and the fourth output stage.

5. The user station as recited in claim 4, wherein the first output stage and the fourth output stage include a PMOS transistor, and the second output stage and the third output stage include an NMOS transistor.

6. The user station as recited in claim 4, wherein the transmitting stage is configured to actively switch only the first output stage and the second output stage for the first operating mode, and to actively switch the first output stage and the second output stage alternatingly with the third output stage and the fourth output stage for the second operating mode.

7. The user station as recited in claim 4, wherein the transmitting stage includes a terminal for a transmit signal of a communication control unit of the user station, and wherein the switching unit includes a switch, which is connected between the terminal for the transmit signal and the third output stage, to switch the transmit signal to a gate terminal of a transistor of the third output stage, or to separate from the gate terminal of the transistor of the third output stage, and a switch, which is connected between the terminal and the fourth output stage, to switch the transmit signal to a gate terminal of a transistor of the fourth output stage, or to separate from the gate terminal of the fourth output stage.

8. The user station as recited in claim 1, wherein the message includes a data field having a variable length, the variable length being between 1 byte to 4096 bytes.

9. The user station as recited in claim 1, wherein the transmitting stage is configured to generate the bus level in the first operating mode with a first bus load resistor and to generate the bus level in the second operating mode with a second bus load resistor, one of the first and second bus load resistors being smaller than the other of the first and second bus load resistors.

10. A bus system, comprising:
  a parallel bus line; and
  at least two user stations which are interconnected via the bus line in such a way that they are able to communicate with one another, at least one of the at least two user stations including:
    a transmitting stage configured to switch between a first operating mode in which the transmitting stage transmits a first phase of a message on the bus line of the bus system and a second operating mode in which the transmitting stage transmits a second phase of the message on the bus line;
  wherein:
    in the first operating mode, (i) a first data value is generated on the bus line by setting two bus wires of the bus line so that voltage levels of the two bus wires are different resulting in a first differential voltage between the two bus wires, and (ii) a second data value is generated on the bus line by setting the two bus wires of the bus line so that the voltage levels of the two bus wires are different; and
    either:
      (a)(1) in the first operating mode, the difference between the voltage levels of the two bus wires when the second data value is generated results in a second differential voltage whose absolute value is equal to an absolute value of the first differential voltage, and (2) in the second operating mode, the first data value is generated on the bus line by setting the two bus wires of the bus line so that the voltage levels of the two bus wires are different and the second data value is generated on the bus line by setting the two bus wires of the bus line so that the voltage levels of the two bus wires are equal to each other; or
      (b)(1) in the second operating mode, (i) the first data value is generated on the bus line by setting the two bus wires of the bus line so that voltage levels of the two bus wires are different, and (ii) the second data value is generated on the bus line by setting the two bus wires of the bus line so that the voltage levels of the two bus wires are different, and (2) the first operating mode and the second operating mode differ from each other with respect to a value of the differential voltage resulting from the different voltage levels on the two bus wires of the bus line.

11. A method for transmitting a message in a serial bus system, the method comprising:
  switching, using a transmitting stage of a user station of the bus system, between a first operating mode in which the transmitting stage transmits a first phase of a message on a bus line of the bus system and a second operating mode in which the transmitting stage transmits a second phase of the message on the bus line; and
  in the first operating mode, (i) generating a first data value on the bus line by setting two bus wires of the bus line so that voltage levels of the two bus wires are different resulting in a first differential voltage between the two bus wires, and (ii) generating a second data value on the bus line by setting the two bus wires of the bus line so that the voltage levels of the two bus wires are different;

wherein:
- (a)(1) in the first operating mode, the difference between the voltage levels of the two bus wires when the second data value is generated results in a second differential voltage whose absolute value is equal to an absolute value of the first differential voltage, and (2) in the second operating mode, the first data value is generated on the bus line by setting the two bus wires of the bus line so that the voltage levels of the two bus wires are different and the second data value is generated on the bus line by setting the two bus wires of the bus line so that the voltage levels of the two bus wires are equal to each other; or
- (b)(1) in the second operating mode, (i) the first data value is generated on the bus line by setting the two bus wires of the bus line so that voltage levels of the two bus wires are different, and (ii) the second data value is generated on the bus line by setting the two bus wires of the bus line so that the voltage levels of the two bus wires are different, and (2) the first operating mode and the second operating mode differ from each other with respect to a value of the differential voltage resulting from the different voltage levels on the two bus wires of the bus line.

12. The user station as recited in claim 1, wherein:
in the first operating mode, the difference between the voltage levels of the two bus wires when the second data value is generated results in the second differential voltage whose absolute value is equal to the absolute value of the first differential voltage; and
in the second operating mode, the first data value is generated on the bus line by setting the two bus wires of the bus line so that the voltage levels of the two bus wires are different and the second data value is generated on the bus line by setting the two bus wires of the bus line so that the voltage levels of the two bus wires are equal to each other.

13. The user station as recited in claim 12, wherein a value of the second differential voltage is negative of a value of the first differential voltage.

14. The user station as recited in claim 1, wherein:
in the second operating mode, (i) the first data value is generated on the bus line by setting the two bus wires of the bus line so that the voltage levels of the two bus wires are different, and (ii) the second data value is generated on the bus line by setting the two bus wires of the bus line so that the voltage levels of the two bus wires are different; and
the first operating mode and the second operating mode differ from each other with respect to the value of the differential voltage resulting from the different voltage levels on the two bus wires of the bus line.

15. The user station as recited in claim 14, wherein absolute values of the differential voltage (a) when the first data value is generated in the first operating mode and (b) when the second data value is generated in the first operating mode are equal.

16. The user station as recited in claim 15, wherein a value of the differential voltage when the first data value is generated in the first operating mode is negative of a value of the differential voltage when the second data value is generated in the first operating mode.

17. The user station as recited in claim 14, wherein absolute values of the differential voltage (a) when the first data value is generated in the second operating mode and (b) when the second data value is generated in the second operating mode are equal.

18. The user station as recited in claim 17, wherein a value of the differential voltage when the first data value is generated in the second operating mode is negative of a value of the differential voltage when the second data value is generated in the second operating mode.

19. The user station as recited in claim 17, wherein absolute values of the differential voltage (a) when the first data value is generated in the first operating mode and (b) when the second data value is generated in the first operating mode are equal and are greater than the absolute values of the differential voltage in the second operating mode.

20. The user station as recited in claim 19, wherein:
a value of the differential voltage when the first data value is generated in the second operating mode is negative of a value of the differential voltage when the second data value is generated in the second operating mode; and
a value of the differential voltage when the first data value is generated in the first operating mode is negative of a value of the differential voltage when the second data value is generated in the first operating mode.

* * * * *